(12) United States Patent
Berens

(10) Patent No.: US 8,325,829 B2
(45) Date of Patent: Dec. 4, 2012

(54) HIGH DATA RATE TRANSMISSION IN A MULTI BAND OFDM SYSTEM

(75) Inventor: Friedbert Berens, Geneva (CH)

(73) Assignee: STMicroelectronics N.V., Amsterdam (NL)

( * ) Notice: Subject to any disclaimer, the term of this patent is extended or adjusted under 35 U.S.C. 154(b) by 1086 days.

(21) Appl. No.: 12/161,722

(22) PCT Filed: Jan. 22, 2007

(86) PCT No.: PCT/EP2007/050610
§ 371 (c)(1), (2), (4) Date: Jul. 22, 2008

(87) PCT Pub. No.: WO2007/085583
PCT Pub. Date: Aug. 2, 2007

(65) Prior Publication Data
US 2010/0220767 A1    Sep. 2, 2010

(30) Foreign Application Priority Data
Jan. 24, 2006   (EP) .................................... 06001410

(51) Int. Cl.
 *H04L 27/28*    (2006.01)
(52) U.S. Cl. ...................................... 375/260
(58) Field of Classification Search ............... 375/260, 375/267
See application file for complete search history.

(56) References Cited

U.S. PATENT DOCUMENTS

| | | | | |
|---|---|---|---|---|
| 5,278,827 | A * | 1/1994 | Pound | 370/394 |
| 2004/0042390 | A1* | 3/2004 | Celebi et al. | 370/210 |
| 2005/0237923 | A1 | 10/2005 | Blakrishnan et al. | 370/208 |
| 2006/0126750 | A1* | 6/2006 | Friedman | 375/260 |
| 2008/0043827 | A1* | 2/2008 | Renfors et al. | 375/230 |
| 2009/0010367 | A1* | 1/2009 | Ojard | 375/346 |

OTHER PUBLICATIONS

"IEEE 802.15a Wireless Personal Area Networks—The MBOA Approach", Hiertz et al., European Wireless Conference, Apr. 2005, pp. 1-7, XP002329983.

* cited by examiner

*Primary Examiner* — Don N Vo
(74) *Attorney, Agent, or Firm* — Allen, Dyer, Doppelt, Milbrath & Gilchrist, P.A.

(57) ABSTRACT

Method for transmitting information in a multi-band OFDM system, comprising delivering according to a given communication standard an initial data stream (IDS), splitting (11) said initial data stream into a chosen number of elementary data streams and simultaneously transmitting (12) said elementary data streams according to said communication standard on said communication medium (MD) within different respective sub-bands (SBi). These sub-bands all blong to the same band group. Proposal based on the MBOA standard.

25 Claims, 4 Drawing Sheets

HIGH DATA RATE TRANSMISSION IN A MULTI BAND OFDM SYSTEM

FIELD OF THE INVENTION

The invention relates to wireless communication systems, and more particularly to the exchanging of information on a multi-band communication medium. The invention may be used, for example, with Ultra High Data Rate transmission above, for example, 1 Gbits/s, in particular between elements of a computer, e.g. a personal computer (PC).

BACKGROUND OF THE INVENTION

The ATA (Advanced Technology Attachment) is a standard interface allowing connection of storage devices within computers of the PC type. The ATA standard is also known under the term IDE ("Integrated drive electronics") or enhanced IDE (EIDE or E-IDE). In February 2003, the serial ATA (SATA or S-ATA) standard was provided to overcome some limitations of the ATA standard. The SATA standard allows high transmission frequencies.

Thus, high speed bus systems compliant with the SATA standard are used in computer systems for exchanging information between elements thereof, for example between a hard disk and a DVD-ROM reader or a CD-ROM reader. The version I of the SATA standard allows wired transmission with a data rate up to 1.5 Gbits/s. However, a wired link or bus between the several elements of the computer is a constraint in the architecture and can constitute a limitation for the data rate performance.

SUMMARY OF THE INVENTION

An object of the invention is to address the above described problem. Another object of the invention is to replace a wired link or wired bus with a wireless link or wireless bus system to implement more reliable connections without sacrificing the data rate performance. Another object of the invention is to provide such a wireless link or bus by using an existing wireless communication standard. However, in such existing communication standards, like the existing Multiband OFDM Alliance (MBOA) Ultra Wide Band (UWB) standard, the maximum data rate is limited (equal to 480 Mbits/s in the MBOA UWB standard).

More generally, another object of the invention is to provide an ultra high data rate wireless transmission, for example above 1 Gbits/s, by using an existing wireless communication standard (as for example the MBOA standard) having a limited data rate smaller than the desired high data rate, as well as existing customary units (as for example MBOA units) or customary building blocks thereof adapted to operate according to the existing wireless communication standard.

According to one aspect, a method for transmitting information on a multi-band wireless communication medium is provided, the method including delivering an initial data stream at a data rate greater than a limited data rate defined by the given communication standard. The initial data stream is accordingly delivered according to the given communication standard. The method further comprises splitting the initial data stream into a chosen number of elementary data streams each having an elementary data rate smaller than or equal to the limited data rate, and simultaneously or concurrently transmitting the elementary data streams according to the communication standard on the communication medium within different respective sub-bands. In other words the existing given communication standard is used without any modification since the initial data stream and the elementary data streams are compliant with the existing given communication standard. It is thus possible, for example, to use customary units or building blocks adapted to operate according to the given communication standard without any modification thereof.

Before the simultaneous transmission of the elementary data streams, each elementary data stream is processed according to the communication standard. And according to an embodiment this processing includes a MAC layer processing and a physical layer processing. And the splitting step is advantageously performed before (or upstream) of the MAC layer processing and the physical layer processing. As such, no modification is needed in customary blocks respectively implementing the MAC layer processing and the physical layer processing. The sub-bands respectively allocated to the elementary data streams may be temporally fixed or temporally modified.

More particularly, according to an embodiment, the sub-bands allocated to the elementary data streams may belong to a set of predefined sub-bands. And, the sub-bands allocated to each elementary data stream may be periodically modified according to a given hopping scheme which is the same for each elementary data stream, and during each period the several elementary data streams may be respectively and simultaneously transmitted within several different sub-bands. The communication standard is preferably an ultra wide band standard based on a multi-band OFDM modulation scheme, for example the MBOA standard.

According to another aspect, a method is provided for processing information having been transmitted according to the method as defined above, and the method for processing comprises simultaneously or concurrently receiving the elementary data streams, processing each received elementary data stream according to the communication standard and recombining all the processed elementary data streams into a recombined data stream having a data rate equal to the sum of all the elementary data rates. The recombined data stream is accordingly compliant with the communication standard. And according to an embodiment, the recombining step is advantageously performed after (or downstream) of the MAC layer processing and the physical layer processing. In such a way again no modification is needed in customary blocks respectively implementing the MAC layer processing and the physical layer processing.

According to another aspect, a method is provided for exchanging information within a computer system between a first element, for example a hard disk and a second element, for example a DVD-ROM reader or a storage element, of the computer system. The method of exchanging including transmitting information from the first element by using the method for transmitting as defined above, the first element delivering the initial data stream. Further, the method includes processing the transmitted information by using the method for processing as defined above, and delivering the recombined data stream to the second element.

According to another aspect, a wireless transmission device is provided and includes N interface units, N being two or more, each interface unit being adapted to transmit information according to a given communication standard with a data rate smaller than or equal to a limited data rate defined by the standard within at least one sub-band of a multi-band wireless communication medium. An input block or means, is coupled to an application unit, for example, adapted to receive an initial data stream at a data rate greater than the limited data rate and smaller than or equal to N times the limited data rate. The initial data stream is accordingly compliant with the given communication standard. A controllable distributing unit is adapted to split the initial data stream into a controllable number of elementary data streams each having an elementary data rate smaller than or equal to a limited data rate, and a transmission management block or means is adapted to determine the controllable number, to select a corresponding number of interface units adapted to respectively receive the elementary data streams and to control the selected interface units such that they respectively transmit the elementary data streams simultaneously or concurrently on the medium within different sub-bands.

Thus according to an embodiment, existing UWB modules (or units) based for example on the WIMEDIA (ECMA) standard are used, and a simple extension may be added (in particular the controllable distributing unit and the transmission management means) so that these customary modules can operate in parallel and transmit a very high data rate stream with a data rate higher than 480 Mbits/s, without changing anything in the physical layer processing or in the basic MAC operation of these customary units. And these existing modules can be integrated to achieve a very high data rate device without changing the wireless communication standard.

According to an embodiment in which each interface unit comprises a first building block implementing a MAC layer processing and a second building block implementing a physical layer processing, the controllable distributing unit may be connected upstream of the first and second building blocks. According to an embodiment, the selected interface units may be adapted to be controlled such that they are adapted to respectively transmit the elementary data streams simultaneously or concurrently on the medium within different temporally fixed sub-bands.

According to another embodiment, the selected interface units may be adapted to be controlled such that they are adapted to respectively transmit simultaneously the elementary data streams on the medium within different temporally modified sub-bands. According to another embodiment, the sub-bands adapted to be allocated to the elementary data streams may belong to a set of predefined sub-bands, the sub-bands adapted to be allocated to each elementary data streams may be periodically modified according to a given hopping scheme which may be the same for each elementary data stream. And, the selected interface units may be adapted to be controlled such that they are adapted to respectively transmit simultaneously during each period the several elementary data streams on the medium within several different sub-bands.

The communication standard may preferably be the MBOA standard. In such a case, each interface unit is advantageously a customary MBOA unit. And as there is no modification of the given communication standard, there is no need to modify an existing customary unit or its building blocks, as for example the physical layer (PHY layer), in particular when the customary unit is a customary MBOA unit.

According to another aspect, a wireless receiving device is provided and includes a receiving input block or means coupled to a multi-band wireless communication medium and adapted to receive simultaneously or concurrently according to a given communication standard at least two different initial elementary data streams within different respective sub-bands. Each initial elementary data stream may have an elementary data rate smaller than or equal to a limited data rate defined by the standard. Two or more (N) interface units may be provided with N being greater than or equal to the number of initial elementary streams. Each interface unit may be adapted to receive and to process one initial elementary stream according to the communication standard, and to deliver a corresponding processed elementary data stream. A controllable recombining unit is adapted to recombine the delivered processed elementary data streams into a recombined data stream complying with the given communication standard and having a data rate equal to the sum of the elementary data streams, and complying accordingly with the given communication standard. A receiving management block or means is adapted to receive management information indicating the number of initial elementary data streams, to select the interface units adapted to respectively receive the initial elementary data streams and to control the recombining unit.

According to an embodiment in which each interface unit comprises a first building block implementing a MAC layer processing and a second building block implementing a physical layer processing, the controllable recombining unit is connected downstream of the first and second building blocks. According to another embodiment, the receiving input block or means is adapted to receive simultaneously the different initial elementary data streams within respective different temporally fixed sub-bands. The receiving input means may be also adapted to receive simultaneously the different initial elementary data streams within respective different temporally modified sub-bands.

For example, the sub-bands may belong to a set of predefined sub-bands, the input means may be adapted to receive simultaneously the different initial elementary data streams within respective different sub-bands which may be periodically modified according to a given hopping scheme which is the same for each elementary data stream. When the communication standard is a MBOA standard, each interface unit of the wireless receiving device is also preferably a customary MBOA unit.

According to another aspect, a wireless system is provided, for example a wireless bus system, including a wireless transmission device as defined above and a wireless receiving device as defined above. According to another aspect, an apparatus is provided, for example a computer or computer system or a computer main board, including a wireless system as defined above, and the input block or means of the wireless transmission device being connected to an application unit, for example a hard disk.

BRIEF DESCRIPTION OF THE DRAWINGS

Other advantages and features of the invention will appear on examining the detailed description of the non-limiting embodiments, and of the appended drawings in which.

DETAILED DESCRIPTION OF THE PREFERRED EMBODIMENTS

Although the invention is not limited to a particular wireless communication standard and can be used for example for any wireless communication standard such as those adapted to multi-carrier based Ultra Wide Band communication systems, or more particularly the IEEE 802.11 family of WLAN standards or the one adapted to the Direct Sequence (DS) based UWB technology, the invention will be now described in more detail for an ultra wide band (UWB) standard based on OFDM (Orthogonal Frequency-Division Multiplexing), called MBOA (Multi-band OFDM Alliance).

The MBOA standard draft is based on a UWB technology and is planned to be used in the frequency band between 3.1 and 10.7 GHz. First implementations using the standard work in the frequency range between 3.1 GHz and 5.0 GHz. At present, the MBOA standard allows data rates of up to 480 Mbits per second.

The wireless transmission is based on a multi-band OFDM system with or without frequency hopping. Each sub-band has a bandwidth of 528 MHz and three sub-bands define a band group in the MBOA standard. In each band group a set of channels is defined based on a hopping pattern deploying the three available sub-bands in a band group. This is the hopping mode called time-frequency interleaved (TFI) mode. Another mode, called fixed-frequency interleaved (FFI) mode, is also available, where no hopping is performed and a device only uses one of the sub-bands for the data transmission.

An MBOA unit, which is used for transmission and reception of data according to the MBOA standard, is an OFDM-based UWB communication interface connected between an application unit and the communication medium, e.g. air. This MBOA unit comprises an UWB MAC layer clocked by a clock signal and connected to a PHY layer and to the application unit. For further details concerning the MAC layer and the PHY layer of the communication interface, those skilled in the art may refer to MBOA PHY layer Technical Specification, Version 1.0, January 2005, and to MBOA MAC layer Technical Specification, Version 0.7, October 2004. The MAC layer manages in particular the transmission/reception of the UWB data stream and is incorporated by software in a control processor.

The building block implementing the PHY layer incorporates for example for the transmission side, the channel coding means, in particular the encoder, the interleaver, the OFDM modulator including IFFT (Inverse Fast Fourier Transform) means, as well as the transmission analog part connected to the antenna. On the receiving side the building block implementing the PHY layer incorporates for example the channel decoding means, in particular the decoder, the deinterleaver, the OFDM demodulator including FFT (Fast Fourier Transform) means, as well as the reception analog part connected to the antenna.

Figure 2:
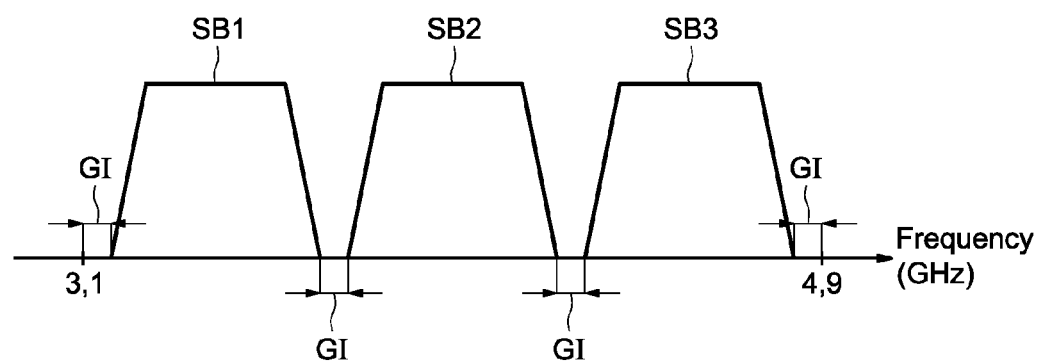
FIG. 2 is a signal diagram illustrating sub-bands used in an MBOA standard.

In FIG. 2, it can be seen that a band of frequencies used for the operation (transmission and/or reception) according to the MBOA standard lies in this example between 3.1 GHz and 4.9 GHz. Further, the frequency band is subdivided into three sub-bands SB1, SB2, SB3 called "hopping sub-bands", which are mutually spaced by a guard interval GI.

Figure 1:
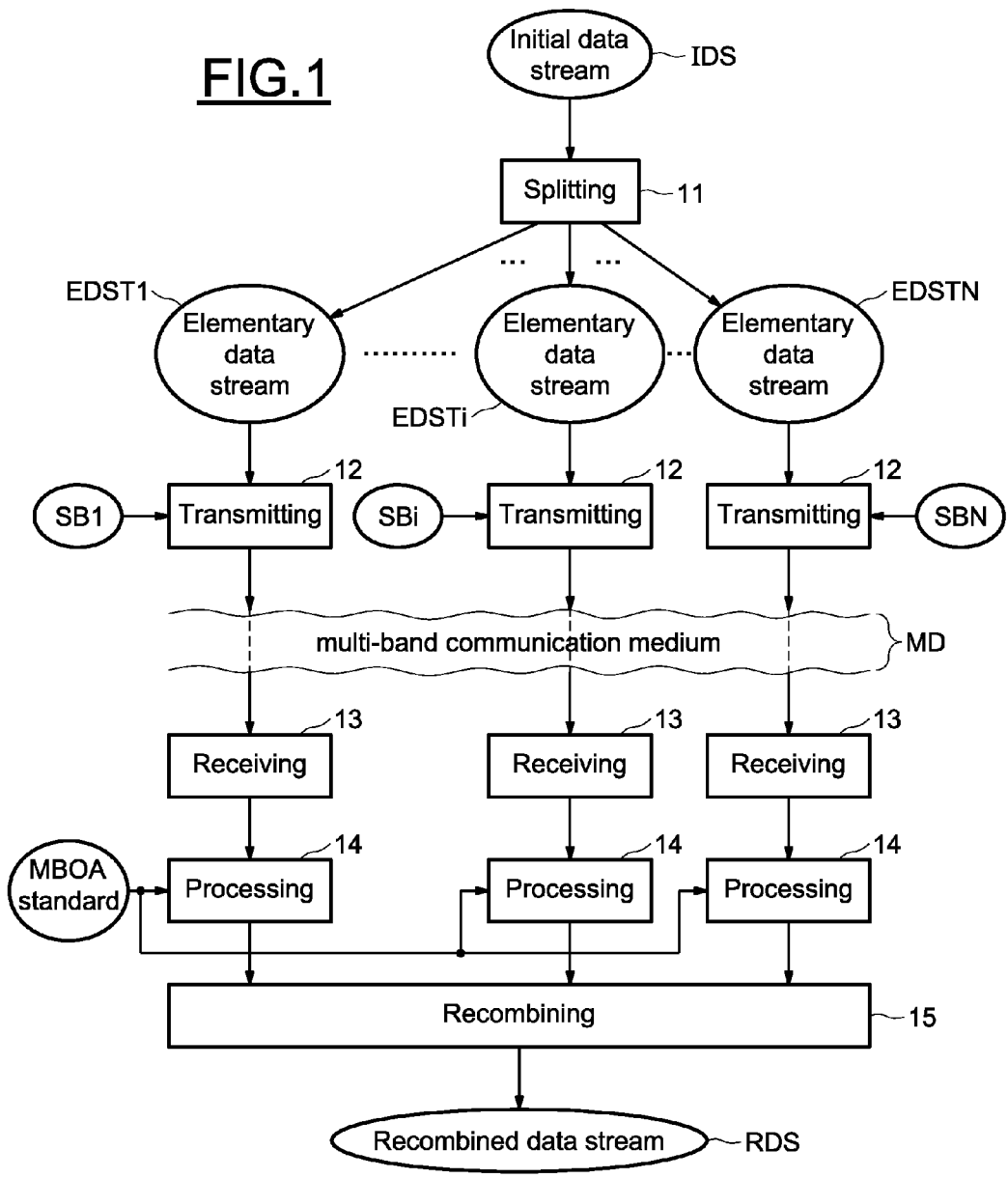
FIG. 1 is a schematic diagram illustrating a flow chart related to embodiments of methods according to the present invention.

In FIG. 1, an initial data stream IDS having a data rate greater than the limited data rate (480 Mbits/s) defined by the MBOA communication standard is delivered. The data rate of the initial data stream IDS is for example equal to 1.44 Gbits/s. To satisfy the requirements of the MBOA communication standard on the data rate point of view, the initial data stream is split (block 11) into a chosen number of elementary data streams, each having an elementary data rate smaller than or equal to the limited data rate.

In the present case, the initial data stream is split into three elementary data streams EDST1-EDSTN (with N=3). Then, the elementary data streams are synchronously transmitted, e.g. in the present case simultaneously, according to the MBOA standard on the multi-band communication medium MD within different respective sub-bands SBi. In other words, at each single time instant, the MBOA units which respectively transmit the elementary data streams, operate on different non-overlapping frequency sub-bands.

Figure 4:
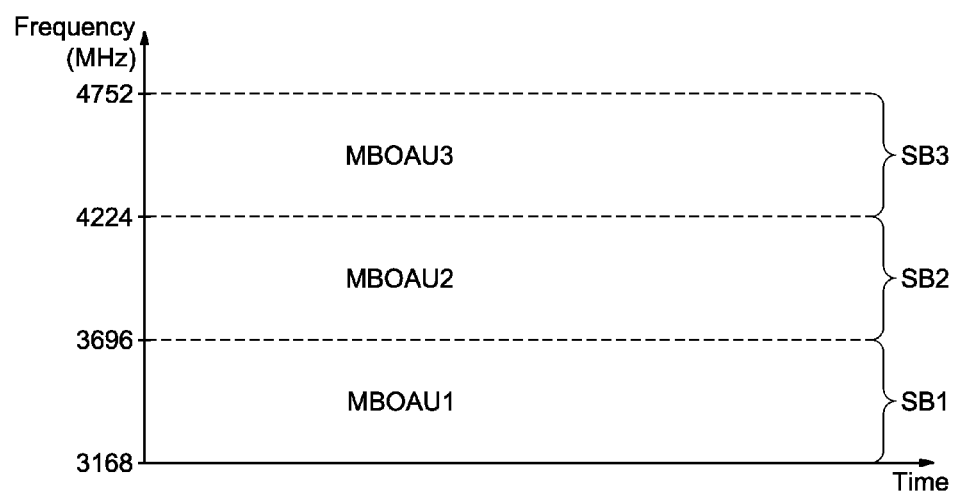

According to a first variation, the sub-bands respectively allocated to the elementary data streams are temporally fixed as for example illustrated in FIG. 4. More precisely, in the present case, the first elementary data stream EDS1, transmitted by the MBOA unit MBOAU1 is transmitted within sub-band SB1 whereas elementary data streams EDST2 and EDST3 are respectively transmitted by the corresponding units MBOAU2 and MBOAU3, within sub-bands SB2 and SB3. In other words, according to this variant of the invention, the FFI mode of the MBOA standard is used. However, according to another variant of the invention, the sub-bands respectively allocated to the elementary data streams may be temporally modified. This is in particular the case when the TFI mode is used.

Figure 3:
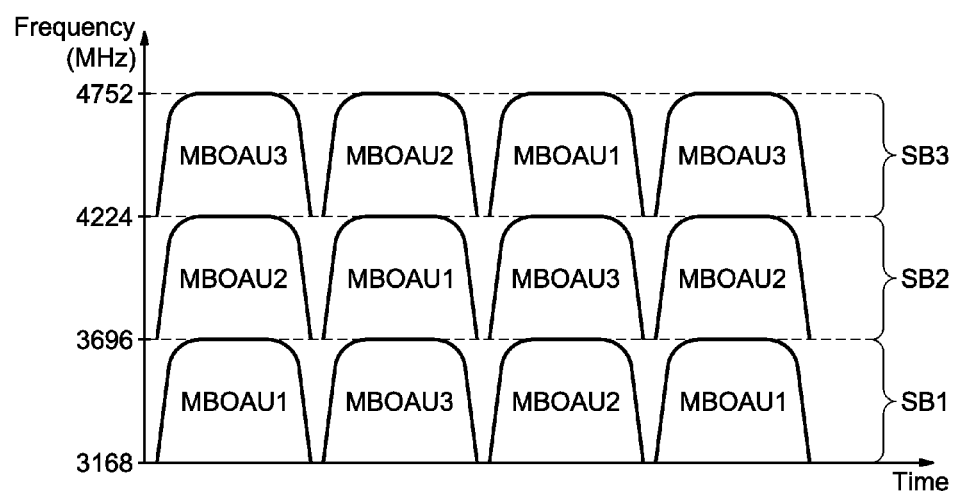
FIGS. 3 and 4 are timing diagrams illustrating two examples of allocations of sub-bands according to an embodiment of the invention.

In such a case, as illustrated in FIG. 3, the sub-bands allocated to each elementary data streams are periodically modified according to a given hopping scheme which is the same for each elementary data stream. And, during each period, the several elementary data streams are respectively and simultaneously transmitted within several different sub-bands. More precisely, in the example illustrated in FIG. 3, the hopping scheme is defined by a same TFI code (TFI=1) and the use of a time shift of one OFDM symbol between the three elementary data streams (or MBOA units).

More precisely, in the present example, the three first OFDM symbols of the three elementary data streams are respectively transmitted within sub-bands SB1, SB2 and SB3, corresponding to a time shift of one OFDM symbol between the three elementary data streams. Because of the use of a TFI code equal to 1, the three next OFDM symbols of the three elementary data streams are respectively transmitted within sub-bands SB2, SB3 and SB1, and so on. Of course, whereas a same TFI code has been used, it is also possible to used different TFI codes in a synchronized manner. Further, although only one band group including three sub-bands has been disclosed, it is possible to use more than one band group if necessary.

On the receiving side, the elementary data streams are simultaneously received from the multi-band communication medium (block 13, FIG. 1), and then processed (block 14) according to the MBOA standard. All the processed elementary data streams are then recombined (block 14) into a recombined data stream RDS having a data rate equal to the sum of all the elementary data rates.

Figure 5:
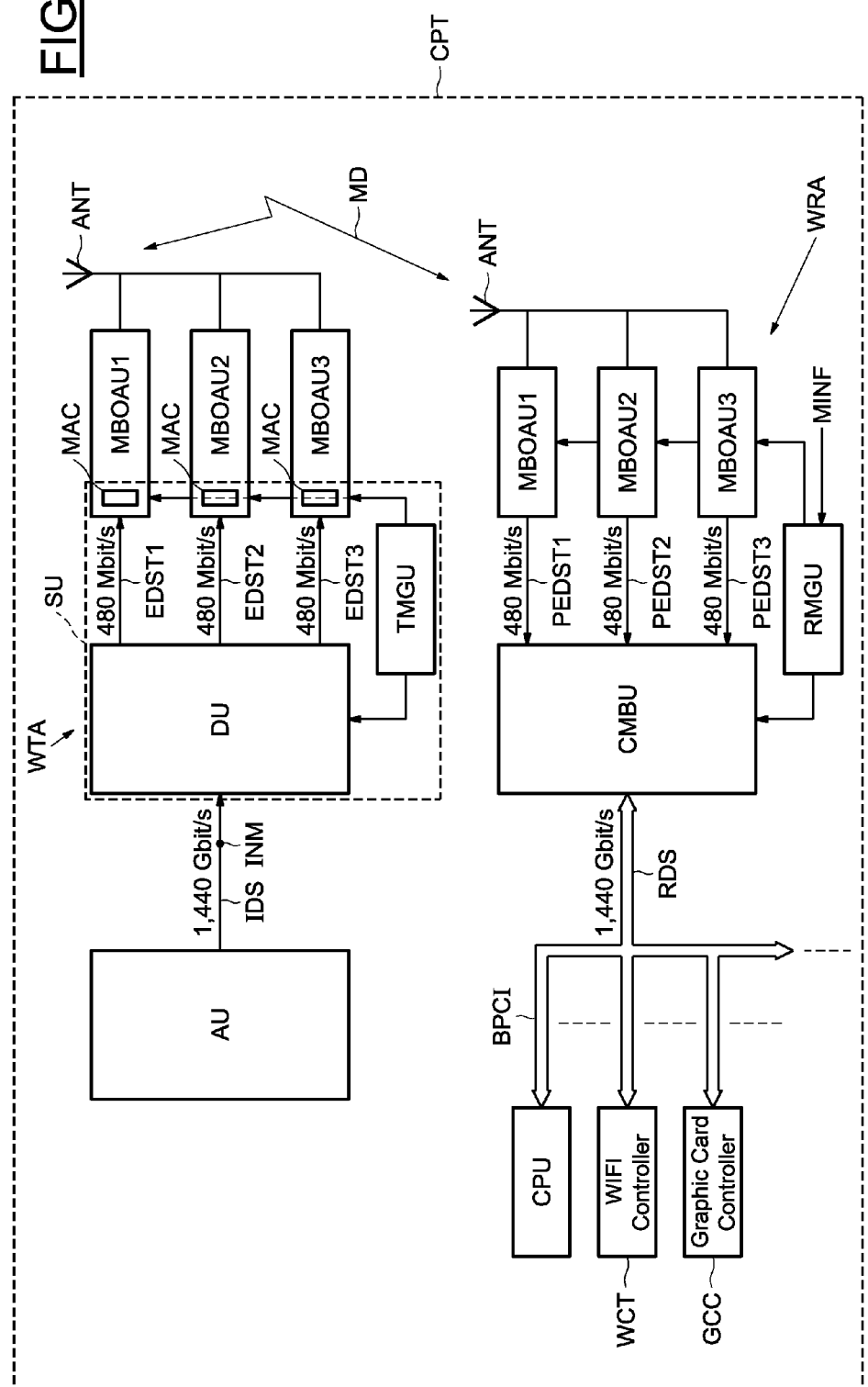
FIG. 5 is a schematic diagram illustrating an embodiment of an apparatus and devices according to the present invention.

Referring now more particularly to FIG. 5, an example of an apparatus CPT according to the invention, including a wireless transmission device WTA and a wireless receiving device WRA will be now detailed. The apparatus CPT may be a computer or computer systems or a computer main board, for example. An application unit AU, for example a hard disk, is adapted to deliver the initial data stream having the data rate equal to 1.44 Gbits/s, to input means INM.

Generally speaking, the wireless transmission device WTA comprises N interface units, for example N MBOA units, N being two or more. In the present case, for example, the wireless transmission device WTA comprises three MBOA units.

Of course, the data rate of the initial data stream delivered by the application unit AU has a data rate which is smaller than or equal to N times the limited data rate of the given communication standard. In the present case, the data rate of the initial data stream IDS is smaller than N times 480 Mbits/s.

A controllable distributing unit DU connected between the input INM and the MBOA units is adapted to split the initial data stream IDS into a controllable number of elementary data streams EDSTi, each of which has an elementary data rate smaller than or equal to the limited data rate of the given communication standard. In this example, the input INM is in fact the input of the distributing unit.

Further, a transmission management block or means TMGU is adapted to determine the controllable number, to select a corresponding number of interface units and to control the selected interface units such that they respectively transmit simultaneously the elementary data streams on the medium within different sub-bands. Of course, the controllable number of selected MBOA units is determined taking into account the limited data rate of the standard and the data rate of the initial data stream IDS. And of course, all the MBOA units are not necessarily selected. For example, only some of them, but at least two, may be selected. The distribution unit DU may be a conventional splitter and the transmission management block or means TMGU may be for example implemented by software within a processor.

If the FFI mode is used, the transmission management block or means TMGU will simply control the MAC layer of each MBOA unit, such that the unit transmits its corresponding elementary data stream within an allocated sub-band. If the hopping mode is used, the transmission management block means TMGU further comprises a synchronization block or means to correctly control the MBOA units, and more specifically the MAC layers thereof, such that at each single time instant, the MBOA units operate on different non-overlapping frequency sub-bands.

Of course, although the transmission management block or means TMGU have been represented in FIG. 5 outside of the distribution units, they may be incorporated therein. Another possibility includes combining within a single and same unit SU (FIG. 5) the transmission management block or means, the controllable distributing unit and the N MAC layers of the N MBOA units. The elementary data streams delivered by the MBOA units may then be simultaneously or concurrently transmitted through an antenna ANT.

If a single common antenna is used for all the MBOA units, a specific well-known device adapted to perform a frequency separation between the elementary data streams may be connected between the MBOA units and the antenna ANT. However, it is also possible to provide each MBOA unit with a separate antenna.

On the receiving side, the wireless receiving device WRA comprises receiving input device or means, for example a single common antenna ANT, coupled to the multi-band wireless communication medium, and adapted to receive simultaneously the different elementary data streams having been transmitted through the medium. These transmitted elementary data streams are referred to here as "initial elementary data streams".

The wireless receiving device WRA further comprises N interface units, here N MBOA units. N is greater than or equal to the number of initial elementary streams and is equal to 3 in this example. Each interface unit is adapted to receive and to process one initial elementary stream according to the communication standard, and to deliver a corresponding processed elementary data stream PEDSTi, having here a data rate equal to 480 Mbits/s.

The wireless receiving device WRA further comprises a controllable recombining unit CMBU connected downstream to the MBCA units and adapted to recombine the delivered process elementary data streams PEDSTi into the recombined data stream RDS having a data rate equal to the sum of the elementary data streams. The wireless receiving device also comprises a receiving management block or means RMGU adapted to receive a management information MINF, from the medium, indicating the number of initial elementary data streams. This management information is for example, emitted by the transmission management block or means TMGU of the wireless transmission device through the control channels of the communication medium.

In response to this management information MINF, the receiving management block or means RMGU are adapted to select the interface units adapted to respectively receive the initial elementary data streams. Further, the receiving management block or means are adapted to control the recombining unit to obtain at the output of the recombining unit a complete data stream. In fact, the recombination of the recombining unit performs the inverse operation of the distribution unit DU.

As for the wireless transmitting device WTA, the receiving management means RMGU may be realized by software within a processor or by a specific wired component. Further, these receiving management means may be implemented outside of the recombining unit or within the recombining unit.

In the present example, the distributing unit DU, the recombining unit, the transmission and receiving management blocks or means as well as all the interface units define a wireless bus system allowing a high data rate. Further, in the present example, this wireless bus system, and more precisely the recombining unit CMBU, delivers the recombined data stream RDS to a specific PCI bus referenced BPCI which can be for example connected to the CPU of the computer, to a Wi-Fi controller WCT and for example, a graphic card controller GCC.

The invention provides for increasing the data rate of the existing standard up to around 1.5 GBit/s using the basic building blocks of a MBOA compliant device. Thus it allows the implementation of ultra high speed devices based on existing blocks. The invention is scalable and the same principle can be used in the future for even high data rates. Future extensions of the MBOA standard towards higher data rates can be used to increase the reachable data rates of the system to even higher overall data rates like 3 GBits/s, which would be sufficient to carry a serial ATA-2 (SATA-II) data stream from hard disk drives. According to an application of the invention, hard disk drives can be combined together and connected to a controller without any mechanical data connector. This could increase the reliability and the usability of the system, for example, especially systems with hot plug functionality. Furthermore, with the present approach, a removable hard drive (HD) could be more easily implemented.

The invention claimed is:

1. A method for multi-band wireless communication of information over a wireless communication medium, the method comprising:
   delivering an initial data stream at a data rate greater than a limited data rate defined by a communication standard;
   dividing the initial data stream into a plurality of elementary data streams each having an elementary data rate smaller than or equal to the limited data rate; and
   synchronously transmitting the plurality of elementary data streams according to the communication standard over the wireless communication medium within different respective sub-bands.

2. The method according to claim 1, wherein the sub-bands respectively corresponding to the plurality of elementary data streams are temporally fixed.

3. The method according to claim 1, wherein the sub-bands respectively corresponding to the plurality of elementary data streams are temporally modified.

4. The method according to claim 3, wherein the sub-bands corresponding to the plurality of elementary data streams belong to a set of predefined sub-bands; and further comprising periodically modifying the respective sub-bands corresponding to each elementary data stream according to a same hopping scheme for each of the plurality of elementary data streams; and wherein during each period the plurality of elementary data streams are respectively and simultaneously transmitted within the different sub-bands.

5. The method according to claim 1, wherein the communication standard is an Ultra Wide Band (UWB) standard based on a multi-band Orthogonal Frequency-Division Multiplexing (OFDM) modulation scheme.

6. The method according to claim 5, wherein the communication standard is defined by the Multi-Band OFDM Alliance (MBOA) standard.

7. The method according to claim 1, further comprising processing the transmitted information including:
synchronously receiving the plurality of elementary data streams;
processing each received elementary data stream according to the communication standard; and
recombining each of the processed elementary data streams into a recombined data stream having a data rate equal to a sum of the elementary data rates.

8. The method according to claim 7, wherein the method is for multi-band wireless communication of information over the wireless communication medium within a computer system between a first element and a second element thereof, the first element delivering the initial data stream; and the method further comprising delivering the recombined data stream to the second element.

9. The method according to claim 1, further comprising processing each elementary data stream according to the communication standard prior to the synchronous transmission of the elementary data streams; wherein the processing includes a MAC layer processing and a physical layer processing, and the dividing is performed upstream of the MAC layer processing and the physical layer processing.

10. A wireless transmission device comprising:
N interface units, where N is greater than one, each interface unit being adapted to transmit information according to a communication standard with a data rate smaller than or equal to a limited data rate defined by the communication standard within at least one sub-band of a multi-band communication medium;
an input adapted to receive an initial data stream at a data rate greater than the limited data rate and smaller than or equal to N times the limited data rate;
a controllable distributing unit adapted to divide the initial data stream into a controllable number of elementary data streams each having an elementary data rate smaller than or equal to the limited data rate; and p1 a transmission management block adapted to determine the controllable number, to select a corresponding number of interface units adapted to respectively receive the elementary data streams and to control the selected interface units to respectively synchronously transmit the elementary data streams over the wireless communication medium within different respective sub-bands.

11. The wireless transmission device according to claim 10, wherein the selected interface units are adapted to be controlled to respectively simultaneously transmit the elementary data streams on the communication medium within different temporally fixed sub-bands.

12. The wireless transmission device according to claim 10, wherein the selected interface units are adapted to be controlled to respectively simultaneously transmit the elementary data streams over the communication medium within different temporally modified sub-bands.

13. The wireless transmission device according to claim 12, wherein the sub-bands corresponding to the elementary data streams belong to a set of predefined sub-bands; the sub-bands corresponding to each elementary data streams being periodically modified according to a same hopping scheme; and wherein the selected interface units are adapted to be controlled to respectively simultaneously transmit the elementary data streams over the communication medium within several different sub-bands during each period.

14. The wireless transmission device according to claim 10, wherein the communication standard is an Ultra Wide Band (UWB) standard based on a multi-band Orthogonal Frequency-Division Multiplexing (OFDM) modulation scheme.

15. The wireless transmission device according to claim 14, wherein the communication standard is defined by the Multi-Band OFDM Alliance (MBOA) standard, and each interface unit defines an MBOA unit.

16. A wireless receiving device comprising:
a receiving input coupled to a multi-band communication medium and adapted to synchronously receive according to a communication standard at least two different initial elementary data streams within different respective sub-bands, each initial elementary data stream having an elementary data rate smaller than or equal to a limited data rate defined by the communication standard;
N interface units, where N is greater than or equal to the number of initial elementary data streams, each interface unit being adapted to receive and to process one of the initial elementary streams according to the communication standard, and to deliver a corresponding processed elementary data stream;
a controllable recombining unit adapted to recombine the delivered processed elementary data streams into a recombined data stream having a data rate equal to a sum of the elementary data streams; and
a receiving management block adapted to receive a management information indicating the number of initial elementary data streams, to select the interface units adapted to respectively receive the initial elementary data streams and to control the recombining unit.

17. The wireless receiving device according to claim 16, wherein the receiving input is adapted to receive simultaneously the different initial elementary data streams within respective different temporally fixed sub-bands.

18. The wireless receiving device according to claim 16, wherein the receiving input is adapted to receive simultaneously the different initial elementary data streams within respective different temporally modified sub-bands.

19. The wireless receiving device according to claim 18, wherein the sub-bands belong to a set of predefined sub-bands; the receiving input being adapted to receive simultaneously the different initial elementary data streams within respective different sub-bands which are periodically modified according to a same hopping scheme.

20. The wireless receiving device according to claim 16, wherein the communication standard is an Ultra Wide Band (UWB) standard based on a multi-band Orthogonal Frequency-Division Multiplexing (OFDM) modulation scheme.

21. Wireless receiving device according to claim 20, wherein the communication standard is defined by the Multi-Band OFDM Alliance (MBOA) standard, and each interface unit defines an MBOA unit.

22. A wireless communication system comprising:
a wireless transmission device including
N transmission interface units, where N is greater than one, each transmission interface unit being adapted to transmit information according to a communication standard with a data rate smaller than or equal to a limited data rate defined by the communication standard within at least one sub-band of a multi-band communication medium,
an input adapted to receive an initial data stream at a data rate greater than the limited data rate and smaller than or equal to N times the limited data rate,
a controllable distributing unit adapted to divide the initial data stream into a controllable number of elementary data streams each having an elementary data rate smaller than or equal to the limited data rate, and
a transmission management block adapted to determine the controllable number, to select a corresponding number of transmission interface units adapted to respectively receive the elementary data streams and to control the selected interface units to respectively synchronously transmit the elementary data streams over the wireless communication medium within different respective sub-bands; and
a wireless receiving device including
a receiving input coupled to the wireless communication medium and adapted to synchronously receive according to the communication standard the elementary data streams within different respective sub-bands,
N receiving interface units each being adapted to receive and to process one of the elementary streams according to the communication standard, and to deliver a corresponding processed elementary data stream,
a controllable recombining unit adapted to recombine the delivered processed elementary data streams into a recombined data stream having a data rate equal to a sum of the elementary data streams, and
a receiving management block adapted to receive a management information indicating the number of initial elementary data streams, to select the receiving interface units adapted to respectively receive the elementary data streams and to control the recombining unit.

23. The wireless system according to claim 22, wherein the wireless transmission device and the wireless receiving device define a wireless bus system.

24. The wireless system according to claim 23, further comprising:
an application unit connected to the input of the wireless transmission device; and
a processor connected to the wireless bus system;
the wireless bus system, the application unit and the processor defining a computer.

25. The wireless system according to claim 24, wherein the application unit comprises a hard disk drive.

* * * * *

UNITED STATES PATENT AND TRADEMARK OFFICE
CERTIFICATE OF CORRECTION

| | | |
|---|---|---|
| PATENT NO. | : 8,325,829 B2 | |
| APPLICATION NO. | : 12/161722 | |
| DATED | : December 4, 2012 | |
| INVENTOR(S) | : Friedbert Berens | |

It is certified that error appears in the above-identified patent and that said Letters Patent is hereby corrected as shown below:

On the Title Page in the abstract, Line 8      Delete: "all blong"
                                                Insert: --all belong--

In the Claims:

Column 9, Line 60                               Delete: "and pl a"
                                                Insert: --and a--

Signed and Sealed this
Fourteenth Day of May, 2013

Teresa Stanek Rea
*Acting Director of the United States Patent and Trademark Office*